United States Patent [19]

Spadaro et al.

[11] Patent Number: 4,695,299
[45] Date of Patent: Sep. 22, 1987

[54] METHOD AND APPARATUS FOR IN-CELL VACUUMING OF RADIOLOGICALLY CONTAMINATED MATERIALS

[75] Inventors: Peter R. Spadaro; Jay E. Smith, both of Pittsburgh; Elmer L. Speer, Ruffsdale; Arnold L. Cecconi, Clairton, all of Pa.

[73] Assignee: The United States of America as represented by the United States Department of Energy, Washington, D.C.

[21] Appl. No.: 831,744

[22] Filed: Feb. 21, 1986

[51] Int. Cl.$^4$ ............................................. B01D 45/12
[52] U.S. Cl. ....................................... 55/274; 55/337; 55/356; 55/429; 55/459 R; 55/485; 55/DIG. 9; 55/315
[58] Field of Search ................. 55/274, 315, 357, 356, 55/345, 337, 350, 342, 429, 471, 472, 21, 97, 459 R, DIG. 9, 485

[56] References Cited

U.S. PATENT DOCUMENTS

| | | | |
|---|---|---|---|
| 1,423,412 | 7/1922 | Garner | 55/357 |
| 1,725,474 | 8/1929 | Parker | 55/429 |
| 2,171,248 | 8/1939 | Berkel | 55/429 |
| 2,534,702 | 12/1950 | Driessen . | |
| 2,535,963 | 12/1950 | Sisemore | 55/429 |
| 2,703,733 | 3/1955 | Steeven | 55/356 |
| 2,943,698 | 7/1960 | Bishop . | |
| 2,962,117 | 11/1960 | Sisemore | 55/350 |
| 3,104,961 | 9/1963 | Westlin . | |
| 3,218,997 | 11/1965 | Berghout . | |
| 3,488,928 | 1/1970 | Tarala | 55/274 |
| 3,636,681 | 1/1982 | Batson . | |
| 3,910,360 | 10/1975 | Sundstrom | 55/337 |
| 3,964,890 | 6/1976 | Bonn . | |
| 4,061,480 | 12/1977 | Frye et al. . | |
| 4,062,664 | 12/1977 | Dupre et al. . | |
| 4,251,241 | 2/1981 | Bothun . | |
| 4,268,288 | 5/1981 | Coombs . | |
| 4,312,291 | 1/1982 | Knab | 55/472 |
| 4,326,842 | 4/1982 | Adachi . | |
| 4,331,459 | 5/1982 | Copley . | |
| 4,348,215 | 9/1982 | Dehne . | |
| 4,544,387 | 10/1985 | Agerlid | 55/274 |

FOREIGN PATENT DOCUMENTS

| | | | |
|---|---|---|---|
| 247865 | 2/1926 | United Kingdom | 55/224 |
| 934293 | 8/1963 | United Kingdom | 55/337 |

Primary Examiner—Bernard Nozick
Attorney, Agent, or Firm—William W. Randolph; Judson R. Hightower; Richard E. Constant

[57] ABSTRACT

A vacuum air flow operated cyclone separator arrangement for collecting, handling and packaging loose contaminated material in accordance with acceptable radiological and criticality control requirements. The vacuum air flow system includes a specially designed fail-safe prefilter installed upstream of the vacuum air flow power supply. The fail-safe prefilter provides in-cell vacuum system flow visualization and automatically reduces or shuts off the vacuum air flow in the event of an upstream prefilter failure. The system is effective for collecting and handling highly contaminated radiological waste in the form of dust, dirt, fuel element fines, metal chips and similar loose material in accordance with radiological and criticality control requirements for disposal by means of shipment and burial.

15 Claims, 3 Drawing Figures

METHOD AND APPARATUS FOR IN-CELL VACUUMING OF RADIOLOGICALLY CONTAMINATED MATERIALS

The United States Government has rights in this invention pursuant to Contract No. N00024-79-4026 between the United States Department of Energy and Westinghouse Electric Corporation.

FIELD OF THE INVENTION

The present invention relates to a method and apparatus for collecting particles of radiologically contaminated material from contaminated locations and more particularly to a method and apparatus for providing a radiologically safe, efficient, and inexpensive means for collecting highly contaminated dust, dirt, fuel element fines, metal chips, and similar loose material for preparation for disposal by shipment or burial.

BACKGROUND OF THE INVENTION

Various portions of nuclear testing, fabrication, power generation or repair installations require periodic cleaning and decontamination. For example, in order to permit routine entry of personnel for repair or replacement of equipment, areas exposed to radiologically contaminated dust, dirt, powder, metal chips or the like, especially in remote or difficult to clean locations, must be cleaned and the contaminated material collected for subsequent shipment and burial.

While vacuum-type equipment is presently available for trapping radioactive particles in a vacuum bladder, as described in U.S. Pat. No. 4,061,480, no method or apparatus presently exists which can filter radiologically contaminated particles in a safe and efficient manner while meeting or exceeding existing radiological and criticality control requirements for collecting and handling widely distributed, highly contaminated particles.

Bonn, in U.S. Pat. No. 3,964,890 discloses a rechargeable particulate filter for absorbing contaminates from radioactive contaminated gas streams but does not describe a method or apparatus for collecting contaminated materials.

SUMMARY OF THE INVENTION

It is therefore an object of the present invention to provide a method and apparatus for meeting or exceeding radiological and criticality control requirements for collecting and handling loose particulate material in nuclear installations that are contaminated with radioactive residual fuel and fission products.

It is a further object of the invention to provide a lightweight system (preferably less than 150 pounds) that is easily portable with single point lifts for remote manipulator transport from one location to another.

It is a further object of the invention to provide a system having a simple and rugged construction that is easy to maintain and service within a contaminated environment by remote manipulator operation.

It is yet a further object of the invention to minimize the potential for generating unacceptable airborne radioactivity within a contaminated area that could be caused by blowing high velocity vacuum discharge air on existing loose surface contamination within the area.

It is still a further object of the invention to provide an apparatus which facilitates remote manipulator disassembly of the apparatus into components that will fit into a standard concrete vault without requiring special cutting operations so that at the end of service life the apparatus may be easily scrapped.

To achieve the foregoing and other objects and in accordance with the present invention, that is embodied and fully described herein, a preferred embodiment of the present invention may comprise a vacuum system having a vacuum power source for collecting radiologically contaminated material for disposal. The vacuum system utilizes an inlet nozzle for collecting the material and a cyclone separator connected to the inlet nozzle to receive the material therefrom. According to the invention, the cyclone separator has a material discharge and airflow discharge. A product container is positioned at the material discharge for receiving material discharged by the cyclone separator. A first prefilter is positioned downstream of the airflow discharge for filtering air from the airflow discharge. A second prefilter is connected between the vacuum source and the first prefilter for automatically reducing or interrupting the vacuum to the cyclone separator upon failure of the first prefilter.

Preferably, a third prefilter is positioned between the second prefilter and the vacuum source. Further, it is advantageous for the product container to be transparent in order to allow for observation of level of material collected therein. Preferably, means are provided for securely supporting the product container against the material discharge of the cyclone separator during operation to prevent any scattering of collected material. The support means is further operable for facilitating removal of the product container from the material discharge for periodic disposal of the material as it accumulates.

Advantageously, means are provided for monitoring a pressure drop across the first prefilter.

Advantageously, the second prefilter comprises a transparent shell having a filter element dividing the shell into an inlet plenum and an outlet plenum whereby airflow through the second prefilter can be observed so that the operator can readily ascertain whether particulates have penetrated or bypassed a potentially failed first prefilter.

Advantageously, an air diffuser is provided on the vacuum source for reducing flow velocity of discharge from the vacuum source to prevent high velocity flow from disturbing unvacuumed loose particles in the area being vacuumed.

It is also preferred that the components of the system be readily removable from each other by remote manipulator so that should a failure occur, each component can be separably replaced.

In another aspect of the present invention, a method of collecting and handling loose contaminated material is described. The method comprises the steps of creating a vacuum induced airflow for vacuuming the contaminated material and then separating the particulate matter from the airflow in a cyclone separator. The particulate matter is collected at a discharge of a cyclone separator in a particle container which is preferably transparent. Afterwards, the airflow downstream of the cyclone separator is filtered in a first prefilter and then refiltered downstream of the first prefilter in a second prefilter to minimize any discharge of contaminated material from the vacuum system. The first and second prefilters are monitored for excessive pressure drop or clogging.

BRIEF DESCRIPTION OF THE DRAWINGS

The accompanying drawings, which are incorporated in and form a part of the specification, illustrate a presently preferred embodiment of the invention, and together with the description, serve to explain the principles of the invention. In the drawings.

DETAILED DESCRIPTION OF THE INVENTION

Reference will now be made in detail to the presently preferred embodiment of the invention, an example of which is illustrated in the accompanying drawings.

Figure 1:
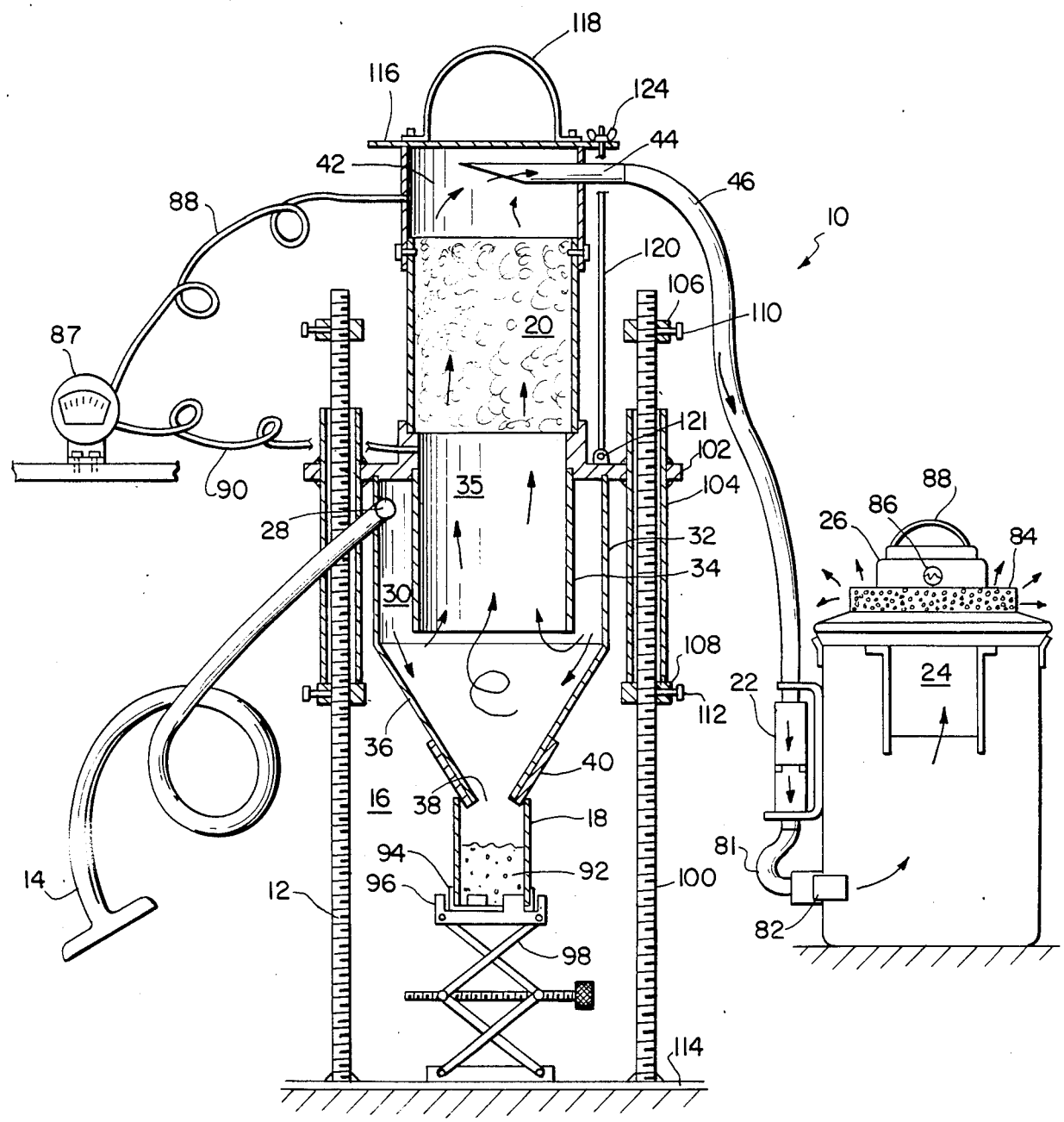
FIG. 1 illustrates an elevational view, in partial section of a radiological particle vacuum system according to the present invention.

Turning first to FIG. 1, there is illustrated the main components of the vacuum system 10. These components comprise a support stand 12 for supporting the vacuum system and an inlet nozzle attachment 14 which feeds particulate matter into a cyclone separator 16. Disposed at an outlet of the cyclone separator is a product container assembly 18 for collecting contaminated material vacuumed by the inlet nozzle attachment 14. Downstream of the cyclone separator 16 is a first prefilter 20, a second prefilter 22, and a third prefilter 24, successively. A commercial vacuum power supply 26, modified as described below, may be used to establish the necessary vacuum power. The inlet nozzle attachment 14 feeds the cyclone separator 16 through a tangential inlet 28.

The purpose of the cyclone separator 16 is to recover particulate material picked up as a result of the vacuuming process. The cyclone operates by generating a high velocity vortex within the separator chamber. The use of centrifugal separators as a first stage of a vacuuming operation is known, for example, from U.S. Pat. No. 4,062,664 to Dupre et al., U.S. Pat. No. 4,268,288 to Coombs, or U.S. Pat. No. 4,348,215 to Dehne. Cyclone separaters per se are also disclosed in U.S. Pat. No. 2,943,698 to Bishop and U.S. Pat. No. 2,534,702 to Driessen.

The cyclone separator 16 of the present invention creates a high air velocity vortex as a result of the tangential chamber inlet 28 and an airflow rate in excess of about 50 cubic feet per minute. As will be understood by one skilled in the art, the cyclone separator may typically comprise an annulus 30 formed by the outside wall 32 of the cyclone separator and the baffle member 34. The cyclone separator preferably has a funnel portion 36 which terminates in an opening 38 positioned above the product container 18. Preferably, means are provided for effectively sealing the funnel 36 to the product container 18. Such means may comprise a foam rubber collar 40 positioned about the funnel opening 38.

Figure 2:
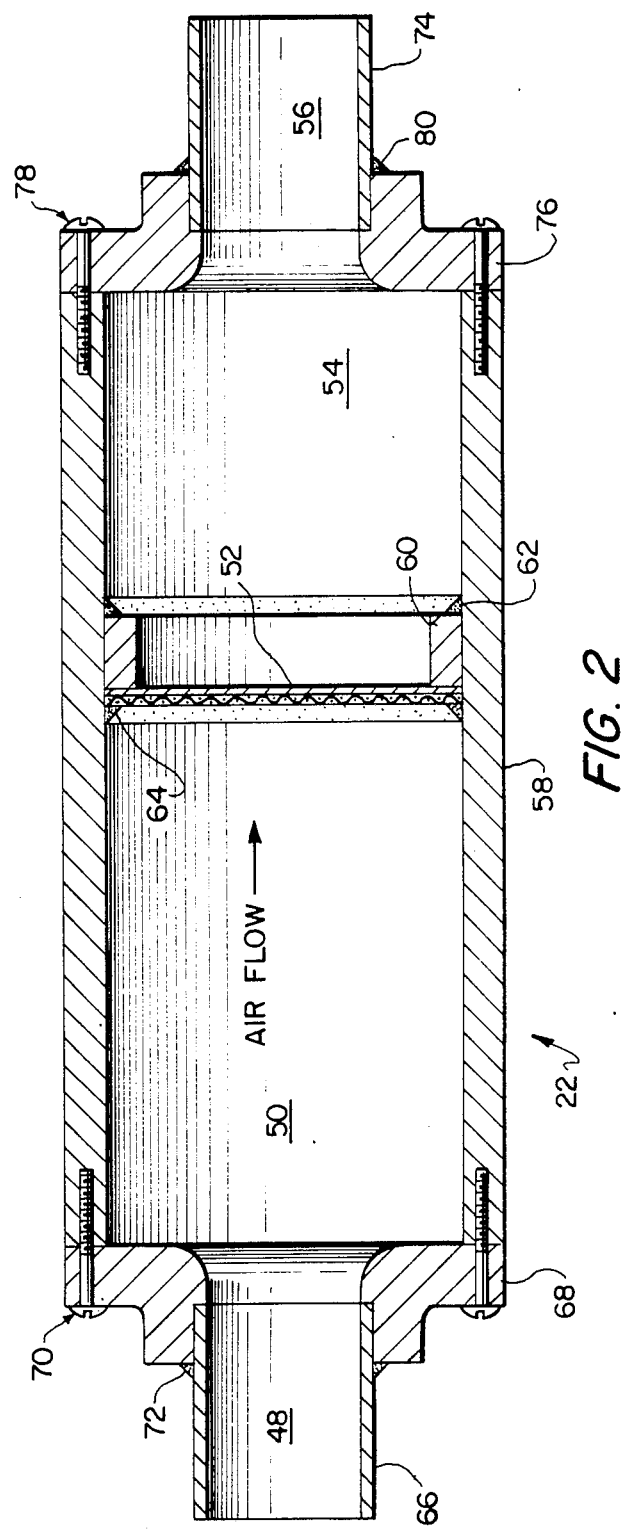
FIG. 2 is a sectional view of a transparent prefilter for the vacuum system of FIG. 1.

In operation, centrifugal force hurls the particulate material towards the outside wall 32 of the cyclone separator where gravity causes it to spiral downward into the product container 18. The lighter and now relatively particulate free air flows upward through the baffle 34 which defines an air flow outlet 35 and into the first prefilter 20. In the environment illustrated, flow through the first prefilter will preferably be on the order of approximately 40-60 cubic feet per minute. Air from the first prefilter is discharged into a discharge plenum 42 and then through a discharge outlet 44 and to the second prefilter 22. Means, such as flexible hose 46, is provided for connecting the discharge outlet 44 to the second prefilter 22. The second prefilter 22 is a fail-safe device and is provided in series with the first prefilter 20. As best seen in FIG. 2, Air flows into the second prefilter 22 through the inlet 48 and then into the air plenum 50. After passing through the wire mesh laminate 52, the air flow passes through the downstream plenum 54 and through the outlet 56. The second prefilter 22 advantageously has a polished plexiglas shell 58 in order to allow the operator to visualize the flow through the plenum 50 and to observe any clogging of the laminate 52. Therefore, should the first prefilter 20 fail, particulate matter will be seen clouding the air in the inlet plenum 50.

The wire mesh laminate 52 functions to stop particulate matter greater than about 2 mils in diameter. The laminate preferably comprises a 200×200 wire mesh for filtering backed by a 10×10 metal mesh screen for strength and rigidity. The wire mesh laminate 52 functions to automatically reduce or shut off the vacuum air flow depending upon the amount of resistance to flow caused by a buildup of particulate matter on the face of the screen.

Means are provided for maintaining the wire mesh laminate in place. Such means may comprise a plexiglas ring 60 held in place by epoxy or plexiglas cement 62. In order to secure the wire mesh laminate 52, means such as a bead of epoxy laminate 64 may be circumscribed about the upstream side of the 200×200 wire mesh where it meets the polished plexiglas shell 58.

Preferably, the flow inlet 48 is formed from a length of copper tubing 66 fitted into a plexiglas face plate 68 which is secured to the plexiglas shell 58 by fastening means such as screws 70. The copper tube 66 may be bonded to the face plate 68 by an epoxy bead 72. As described below, the copper tube will receive a hose 46 which communicates with the first prefilter 20.

Similarly, the flow outlet 56 may be formed from a copper tube 74 held in a plexiglas face plate 76 which is secured to the plexiglas shell 58 by fastening means 78. The copper tube 74 may be bonded to the face plate 76 by a bead of epoxy 80 and support a hose 81 described below.

Turning again to FIG. 1, air flow from the second prefilter 22 enters a vacuum power supply 26, preferably a standard 110 volt AC power device having a nominal flow rate of on the order of 100 cubic feet per minute at standard conditions of temperature and pressure. In the event that prefilters 20 and 22 should fail, a third prefilter 24 is provided, which preferably comprises a remotely changeable filter capable of removing 99.97 percent of particulate material having a size equal to or greater than 0.3 microns. The second prefilter 22 is connected to the power source via a hose 81 and inlet 82.

Preferably, means are provided for reducing the air velocity at the power supply discharge. Such means may include an air discharge diffuser 84. The purpose of the diffuser 84 is to minimize the potential for generating unacceptable contamination that could be caused by blowing high velocity vacuum discharge air onto existing loose surface contamination within the cell being vacuumed.

Advantageously, means are provided for indicating when the vacuum power supply is on. Such means may include a red indicator light 86 or the like. In addition, means are provided for allowing the vacuum power supply 26 to be remotely handled. Such means may include a simple single point lift 88 attached to the top of the vacuum power supply 26.

It should be noted that in the above discussion, the filters 20, 22 and 24 are all referred to as prefilters. The reason for this is that during cleaning operations, all the air from the enclosure being vacuumed, including the air from the vacuum power supply 26 is preferably processed through a final filtering system which may contain an additional series of filters such as a stage 1 HEPA filter, a stage 2 charcoal filter and a stage 3 HEPA filter. It is from this final filtering system (not illustrated) that air will be eventually discharged to the atmosphere.

One reason why the indicator light 86 on the vacuum power source 26 is important is that when the vacuum power supply is in operation, it may not be possible to hear the vacuum motor running since it may be disposed in a hot cell. However, the presence of the indicator 86 can be observed through a window of the hot cell to indicate when the vacuum motor is operating and thus facilitating the proper securing of the system when not in use.

It should be appreciated that the vacuuming system described can use any of various attachments similar to those used in vacuuming a home except that the vacuum inlet nozzle attachments are handled by a remote manipulator operation. As used herein, a remote manipulator is a device for performing servomotor-type manipulations in an environment that is hostile to or, for any reason, inaccessible to human presence.

In order to insure that the system is operating properly during normal use, it is necessary to periodically monitor, by visual inspection, the amount of material accumulating in the product container 18, the magnitude of the pressure drop across the prefilter 20, and the quality of the air passing through the prefilter 22 to be sure that it is clean and that no significant particulate accumulation is occurring on the upstream face of the wire mesh laminate 52.

In order to monitor the magnitude of the pressure drop across the prefilter 20, means such as a magnehelic gauge 87 is provided. The static pressure across the filter 20 is determined by means of the flexible pressure lines 88 and 90 which are positioned to sense the static pressure on either side of the prefilter 20.

The amount of particulate material 92 in the product container 18 can be observed directly since the product container 18 is preferably formed from a clear acrylic.

The product container 18 is bottom capped, preferably by a plastic end cap 94, which is supported in a scalloped ring holder 96. Preferably, means are provided for raising and lowering the product container 18 in order to facilitate removal of the captured particulate material. Such means may include a scissor jack or the like 98 for raising and lowering the product container 18.

The vacuum system 10 is preferably supported on two or more threaded rods 100 by means of a projecting flange member 102 which is secured to the cyclone separator 16. Guide tubes or sleeves 104 which fit coaxially about the threaded rods 100 are secured to the flange member 102 in order to adjust the position of the cyclone separator. The guide tubes are supported and restrained top and bottom, by hex nuts 106 and 108, respectively, which may be held in place by set screws 110 and 112, respectively. Preferably, the threaded rods 100 are bonded or otherwise fastened to a stand base plate 114 to provide an overall sturdy and stable but lightweight structure.

Figure 1A:
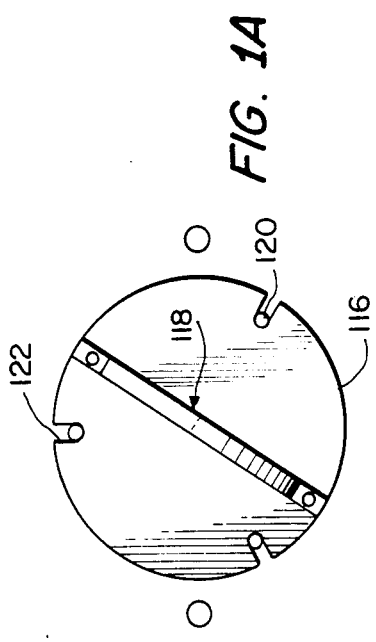
FIG. 1A is a plan view of a single point lift of the vacuum system of FIG. 1.

The top of the discharge plenum 42 is covered by a plate member 116 which carries on it a single point lifting member 118 which is best seen in FIG. 1A. The single point lifting member 118 permits easy remote manipulation of the vacuum system 10. The face plate 116 is secured by a plurality of swing bolts 120 which are preferably pivotally secured to the flange member 102 by pivots 121 and which cooperate with slots 122 formed to the top plate 116 and wing nuts 124 or the like to hold down the top plate.

When the product container 18 is full or when the particulate accumulation in the container 18 has reached a calculated amount that should not be exceeded (based, for example, on a radio-chemistry analysis of prior samples) the container is removed and capped. As alluded to above, removal is accomplished by a remote manipulation of the scissor jack 98. The product container can then be weighed and the amount of material collected determined. The amount of material actually removed from the container can be decreased if necessary to be in conformance with scrap-out, shipping, and burial requirements. Assuming that the amount of particulate material in the product container 18 is not in excess of that permitted, it can then be placed in a standard lead pig in preparation for scrap-out in accordance with standard procedures for removal of high-level scrap.

In the event that the pressure drop across the first prefilter 20 exceeds a predetermined amount, the vacuum power supply 26 can be turned off and the prefilter 20 can be physically tapped or jogged to cause some of the particles contributing to the increased pressure drop to fall into the product container 18. When physical jogging of the prefilter 20 is ineffective for maintaining the pressure drop across the filter within an acceptable range, the first prefilter 20 should be replaced.

In the event that the first prefilter 20 fails, as indicated by a sudden change in pressure drop across it or by particulate material accumulation on the face of the wire mesh laminate 52 in the second prefilter 22, the first prefilter 20 should be replaced and prefilter 22 either replaced or cleaned as required.

As should be appreciated, the present system is fabricated from a series of separable components. Therefore, should any system component in the vacuum line fail, it can be scrapped out and replaced with a new component. In other words, the entire system does not require replacement as a result of the failure of one component.

The system described above is quite durable since it contains a minimum of moving or adjustable parts. Moreover, because of the unique frame structure and scissor jack, the vacuum system described above provides operational flexibility and allows the amount of material to be collected to be observed, weighed, and adjusted in accordance with radiological and criticality control requirements for disposal. The volume adjustment can be based on sample radio-chemistry analysis.

It should be further understood that the second prefilter 22 constitutes a fail-safe filter which is upstream of the vacuum power supply 26. The prefilter 22 acts as a fail-safe filter by reducing or shutting off vacuum air flow in the event that the first prefilter 20 fails.

While the design illustrated in FIGS. 1 and 2 has been described as providing a radiologically safe, efficient and inexpensive system for collecting highly contaminated dust, dirt, powder-like material, metal chips, and similar materials in preparation for disposal by shipment or burial, it should be appreciated that any size product container may be used merely by changing the stand and funnel size. However, any change in size must be consistent with radiological and criticality control requirements.

In addition, while the preferred embodiment utilizes a metal screen laminate 52 comprising a 200×200 metal mesh screen backed by a 10×10 metal mesh screen, it should be appreciated that other filter elements can also be used according to the invention by matching the total system airflow rate with the proper screen mesh and percent open area. A plurality of screen layers or other commercially available filtering material may be used to fine tune the performance of the second prefilter 22 as a fail-safe device.

The foregoing description of a preferred embodiment of the invention has been presented for purposes of illustration and description. It is not intended to be exhaustive or to limit the invention to the precise form disclosed and obviously many modifications and variations are possible in light of the above teachings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A vacuum system having a vaccum source for collecting radiologically contaminated material for disposal, comprising:
   an inlet nozzle for collecting said material;
   a cyclone separator connected to said inlet nozzle to receive said material therefrom, said cyclone separator having a material discharge and an air flow discharge;
   a product container positioned at said material discharge for receiving material discharged from said cyclone separator, said product container is transparent for allowing obsertation of a level of material collected therein;
   a first prefilter downstream of said air flow discharge for filtering air from said air flow discharge;
   a second prefilter connected between said vacuum source and said first prefilter for filtering air from asid first prefilter, said second prefilter having means for visually observing the air flow in said second prefilter;
   means for monitoring a pressure drop across said first prefilter; and
   a third prefilter between said second prefilter and said vacuum source.

2. The vacuum system of claim 1 wherein said first prefilter communicates with said second prefilter through a first flexible hose and said second prefilter communicates with said third prefilter through a second flexible hose.

3. A vacuum system having a vacuum source for collecting radiologically contaminated material for disposal, comprising
   an inlet nozzle for collecting said material;
   a cyclone separator connected to said inlet nozzle to receive said material therefrom, said cyclone separator having a material discharge and an air flow discharge;
   a product container positioned at said material discharge for receiving material discharged from said cyclone separator;
   a first prefilter connected to said air flow discharge and positioned downstream of said air flow discharge for filtering air from said air flow discharge;
   a second prefilter connected between said vacuum source and said first prefilter for filtering air from said first prefilter;
   an adjustable support frame connected to said cyclone separator and said first prefilter for adjusting the vertical position of said cyclone separator and said first prefilter above said product container; and
   lift means connected to said support frame for lifting said support frame, said cyclone separator, and said first prefilter as an integral unit and for facilitating remote handling.

4. A vaccum system having a vacuum source for collecting radiologically contaminated material for disposal, comprising
   an inlet nozzle for collecting said material;
   a cyclone separator connected to said inlet nozzle to receive said material therefrom, said cyclone separator having a material discharge and an air flow discharge;
   a product container positioned at said material discharge for receiving material discharged from said cyclone separator, wherein said product container is transparent for allowing observation of a level of material collected therein;
   a first prefilter downstream of said air flow discharge for filtering air from said air flow discharge;
   a second prefilter connected between said vacuum source and said first prefilter, said second prefilter further comprising a transparent shell having a filter element dividing said shell into an inlet plenum and an outlet plenum, wherein the vacuum flow through said inlet plenum can be observed and wherein said filter element is operable to trap material passing through said first prefilter and to effectively reduce or interrupt communication between said vacuum source and said cyclone separator when trapped material clogs said filter element;
   a third prefilter between said second prefilter and said vacuum source, wherein said first prefilter communicates with said second prefilter through a first flexible hose and said second prefilter communicates with said third prefilter through a second flexible hose;
   an adjustable support frame for supporting asid cyclone separator above said product container, wherein said support frame is operable to support said cyclone separator at an adjustable height and wherein said first prefilter is removably disposed downstream of said cyclone separator and is supported by said support frame;
   means for supporting said product container against said material discharge during operation and for facilitating removal of said product container from said material discharge for disposal of said material;
   means for monitoring a pressure drop across said first prefilter; and
   an air diffuser for reducing flow velocity from said vacuum source.

5. A vacuum system having a vacuum source for collecting radiologically contaminated material for disposal, comprising:
- an inlet nozzle for collecting said material;
- a cyclone separator connected to said inlet nozzle to receive said material therefrom, said cyclone separator having a material discharge and an air flow discharge;
- a product container positioned at said material discharge for receiving material discharged from said cyclone separator, said product container is transparent for allowing observation of a level of material collected therein;
- a first prefilter downstream of said air flow discharge for filtering air from said air flow discharge;
- a second prefilter connected between said vacuum source and said first prefilter for filtering air from said first prefilter, said second prefilter having means for visually observing the air flow in said second prefilter;
- means for monitoring a pressure drop across said first prefilter; and
- means for supporting said product container against said material discharge during operation and for facilitating removal of said product container from said material discharge for disposal of said material.

6. A vacuum system having a vacuum source for collecting radiologically contaiminated material for disposal, comprising:
- an inlet nozzle for collecting said material;
- a cyclone separator connected to said inlet nozzle to receive said material therefrom, said cyclone separator having a material discharge and an air flow discharge;
- a product container positioned at said material discharge for receiving material discharged from said cyclone separator, said product container is transparent for allowing observation of a level of material collected therein;
- a first prefilter downstream of said air flow discharge for filtering air from said air flow discharge;
- a second prefilter connected between said vacuum source and said first prefilter for filtering air from said first prefilter, said second prefilter having means for visually observing the air flow in said second prefilter;
- means for monitoring a pressure drop across said first prefilter; and
- an air diffuser for reducing flow velocity from said vacuum source.

7. The vacuum system of claim 6 wherein said second prefilter means comprises a transparent shell having a filter element dividing said shell into an inlet plenum and an outlet plenum, wherein the vacuum flow through said inlet plenum can be observed.

8. The vacuum system of claim 7 wherein said filter element is operable to trap material passing through said first prefilter and to effectively automatically reduce or interrupt communication between said vacuum source and said cyclone separator when trapped material clogs said filter element.

9. A vacuum system having a vacuum source for collecting radiologically contaminated material for disposal, comprising:
- an inlet nozzle for collecting said material;
- a cyclone separator connected to said inlet nozzle to receive said material therefrom, said cyclone separator having a material discharge and an air flow discharge;
- a product container positioned at said material discharge for receiving material discharged from said cyclone separator, said product container is transparent for allowing observation of a level of material collected therein;
- a first prefilter downstream of said air flow discharge for filtering air from said air flow discharge;
- a second prefilter connected between said vacuum source and said first prefilter for filtering air from said first prefilter, said second prefilter having means for visually observing the air flow in said second prefilter;
- means for monitoring a pressure drop across said first prefilter; and
- lift means connected to said cyclone separator and said first prefilter for facilitating remote handling.

10. A vacuum system having a vacuum soure for collecting radiologically contaminated material for disposal comprising:
- an inlet nozzle for collecting said material;
- a cyclone separator connected to said inlet nozzle to receive said material therefrom, said cyclone separator having a material discharge and an air flow discharge;
- a product container positioned at said material discharge for receiving material discharged from said cyclone separator, said product container is transparent for allowing observation of a level of material collected therein;
- a first prefilter downstream of said air flow discharge for filtering air from said air flow discharge;
- a second prefilter connected between said vacuum source and said first prefilter for filtering air from said first prefilter, said second prefilter having means for visually observing the air flow in said second prefilter;
- means for monitoring a pressure drop across said first prefilter; and
- an adjustable support frame for supporting said cyclone separator above said product container.

11. The vacuum system of claim 10 wherein said support frame is operable to support said cyclone separator at an adjustable height.

12. The vacuum system of claim 10 wherein said first prefilter is removably disposed downstream of said cyclone separator and is supported by said support frame.

13. A vacuum system having a vacuum source for collecting radiologically contaminated material for disposal, comprising:
- an inlet nozzle for collecting said material;
- a cyclone separator connected to said inlet nozzle to receive said material therefrom, said cyclone separator having a material discharge and an air flow discharge;
- a product container positioned at said material discharge for receiving material discharged from said cyclone separator, said product container is transparent for allowing observation of a level of material collected therein;
- a first prefilter downstream of said air flow discharge for filtering air from said air flow discharge;
- a second prefilter connected between said vacuum source and said first prefilter for filtering air from said first prefilter, said second prefilter having means for visually observing the air flow in said second prefilter;

means for monitoring a pressure drop across said first prefilter;

an adjustable support frame connected to said cyclone separator and said first prefilter for adjusting the vertical position of said cyclone separator and said first prefilter above said product container; and lift means connected to said support frame for lifting said support frame, said cyclone separator, and said first prefilter as an integral unit.

14. The vacuum system of claim 13 further comprising lifting means connected to said vacuum source and said second prefilter for lifting said vacuum source and said second prefilter as an integral unit.

15. The vacuum source of claim 14 wherein said first prefilter communicates with said second prefilter through a flexible hose for permitting relative displacements between said first and second prefilters.

* * * * *